US008174486B2

(12) United States Patent
Woo

(10) Patent No.: US 8,174,486 B2
(45) Date of Patent: May 8, 2012

(54) LIGHT SENSING CIRCUIT, LIQUID CRYSTAL DISPLAY HAVING THE SAME, AND METHOD OF DRIVING THE SAME USING DETECTED EXTERNAL LIGHT, INTERNAL LIGHT, AND PERIPHERAL LIGHT

(75) Inventor: Doo-Hyung Woo, Anyang-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 653 days.

(21) Appl. No.: 12/357,874

(22) Filed: Jan. 22, 2009

(65) Prior Publication Data

US 2010/0045908 A1    Feb. 25, 2010

(30) Foreign Application Priority Data

Aug. 20, 2008  (KR) .................. 10-2008-0081469

(51) Int. Cl.
G09G 3/36       (2006.01)
(52) U.S. Cl. ..................................... 345/102
(58) Field of Classification Search .................. None
See application file for complete search history.

(56) References Cited

U.S. PATENT DOCUMENTS

| 4,814,864 | A * | 3/1989 | Pritchard ................ 348/227.1 |
| 7,205,524 | B2 * | 4/2007 | Drummond et al. ....... 250/214 C |
| 7,256,379 | B2 * | 8/2007 | Sugiyama et al. ......... 250/208.1 |
| 7,531,776 | B2 * | 5/2009 | Koide ........................ 250/205 |
| 7,619,194 | B2 * | 11/2009 | Kobashi ................... 250/205 |
| 2007/0126697 | A1 * | 6/2007 | Sato et al. .................. 345/156 |
| 2007/0215969 | A1 * | 9/2007 | Koide et al. ................ 257/431 |
| 2007/0268241 | A1 * | 11/2007 | Nitta et al. ................. 345/102 |
| 2008/0084366 | A1 * | 4/2008 | Saito et al. .................. 345/76 |
| 2008/0094347 | A1 * | 4/2008 | Lee et al. .................... 345/102 |
| 2009/0066876 | A1 * | 3/2009 | Woo et al. ................... 349/61 |
| 2009/0084943 | A1 * | 4/2009 | Solhusvik et al. ......... 250/214 AL |

FOREIGN PATENT DOCUMENTS

| JP | 2006-118965 | 5/2006 |
| JP | 2007-309984 | 11/2007 |
| JP | 2008-033238 | 2/2008 |

* cited by examiner

*Primary Examiner* — Hoa T Nguyen
*Assistant Examiner* — Mark Fischer
(74) *Attorney, Agent, or Firm* — F. Chau & Associates, LLC

(57) ABSTRACT

A light sensing circuit includes a sensor unit, a voltage generator and a readout circuit. The sensor unit includes a first sensor that detects an external light to output a first current value, a third sensor that detects an internal light generated from the backlight unit to output a third current value, and a second sensor that detects a peripheral light isolated from the external light and the internal light to output a second current value. The sensor unit outputs a first differential value between the third current value and the second current value and a second differential value between the first current value and the second current value. The voltage generator generates a reference voltage based on the first differential value and a sensing voltage based on the second differential value. The readout circuit outputs brightness information of the external light using the reference voltage and the sensing voltage.

20 Claims, 5 Drawing Sheets

LIGHT SENSING CIRCUIT, LIQUID CRYSTAL DISPLAY HAVING THE SAME, AND METHOD OF DRIVING THE SAME USING DETECTED EXTERNAL LIGHT, INTERNAL LIGHT, AND PERIPHERAL LIGHT

CROSS-REFERENCE TO RELATED APPLICATION

This application claims priority to Korean Patent Application No. 2008-81469, filed on Aug. 20, 2008, the disclosure of which is incorporated by reference in its entirety herein.

BACKGROUND

1. Technical Field

The disclosure relates to a light sensing circuit, a liquid crystal display having the same, and a method of driving the same. More particularly, the disclosure relates to a light sensing circuit to detect external illuminance, a liquid crystal display having the same, and a method of driving the same.

2. Discussion of Related Art

Liquid crystal displays (LCDs) have been extensively used due to their superior image quality, lightness, slimness and low power consumption. Since an LCD is a non-emissive display apparatus, a light source, such as a backlight unit, is necessary.

A white light emitting diode (LED) may be used as a backlight unit in a small-sized or medium-sized display apparatus. A cold cathode fluorescent lamp (CCFL) may be used as a backlight unit in a large-sized display apparatus, such as a laptop computer.

The backlight unit can consume a majority of the power in an LCD. Power consumption can be reduced in a backlight unit of an LCD by use of a sensor. For example, a sensor may be attached to an outer portion of an LCD to detect peripheral illuminance, and a sensing circuit can then be used to convert an analog signal detected from the sensor into a digital signal to control brightness of the backlight unit by using the digital signal.

However, the output value of the sensor may vary under the same peripheral luminance due to deviation between sensors. The sensing circuit may be provided with a calibration circuit to calibrate the deviation between sensors. However, since the internal structure of conventional sensing circuits are complicated, the manufacturing cost of the LCD is increased.

The conventional sensor and the sensing circuit may be fabricated separately from the manufacturing process for an LCD panel and attached to an outer portion of the LCD panel when the LCD panel is assembled as a product. However, fabricating the sensor and the sensing circuit separately can increase the manufacturing time and the manufacturing cost for the LCD.

Thus, there is a need for a light sensing circuit capable of obtaining the same digital output value under the same peripheral luminance regardless of deviation between sensors, an LCD having the light sensing circuit, and a method of driving the light sensing circuit.

SUMMARY

In an exemplary embodiment of the present invention, a light sensing circuit includes a sensor unit, a voltage generator and a readout circuit. The sensor unit includes a first sensor that detects an external light to output a first current value, a third sensor that detects an internal light generated from a backlight unit to output a third current value, and a second sensor that detects a peripheral light isolated from the external light and the internal light to output a second current value. The sensor unit outputs a first differential value between the third current value and the second current value and a second differential value between the first current value and the second current value.

The voltage generator generates a reference voltage in response to the first differential value and a sensing voltage in response to the second differential value. The readout circuit detects a first rising time, during which the reference voltage reaches predetermined target voltage, and a second rising time, during which the sensing voltage reaches the predetermined target voltage, based on the first rising time, and outputs the second rising time as brightness information of the external light.

In another exemplary embodiment of the present invention, the light sensing circuit is incorporated into a liquid crystal display. The liquid crystal display further includes a backlight unit supplying the internal light (e.g., a backlight) and controlling a brightness of the internal light based the brightness information provided by the light sensing circuit.

A method for driving a light sensing circuit that detects brightness information of an external light is provided in a further exemplary embodiment of the present invention. The method includes detecting an external light and outputting a first current value that is representative of the external light, detecting an internal light generated by a backlight and outputting a third current value that is representative of the internal light, and detecting a peripheral light isolated from the external light and the internal light and outputting a second current value that is representative of the peripheral light. The method further includes detecting a first differential value between the third current value and the second current value and a second differential value between the first current value and the second current value, generating a reference voltage by integrating the first differential value, generating a sensing voltage by integrating the second differential value, converting the sensing voltage into digital data based on a first time during which the reference voltage reaches a predetermined target voltage, and detecting the brightness information of the external light based on the digital data.

The converting of the sensing voltage into the digital data may include counting the first time and converting a count result thereof into first data, counting a second time during which the sensing voltage reaches the predetermined target voltage and converting a count result thereof into second data, and converting the second data into the digital data based on the first time included in the first data.

BRIEF DESCRIPTION OF THE DRAWINGS

Embodiments of the present invention will become readily apparent by reference to the following detailed description when considered in conjunction with the accompanying drawings wherein.

DETAILED DESCRIPTION OF EXEMPLARY EMBODIMENTS

Figure 1:
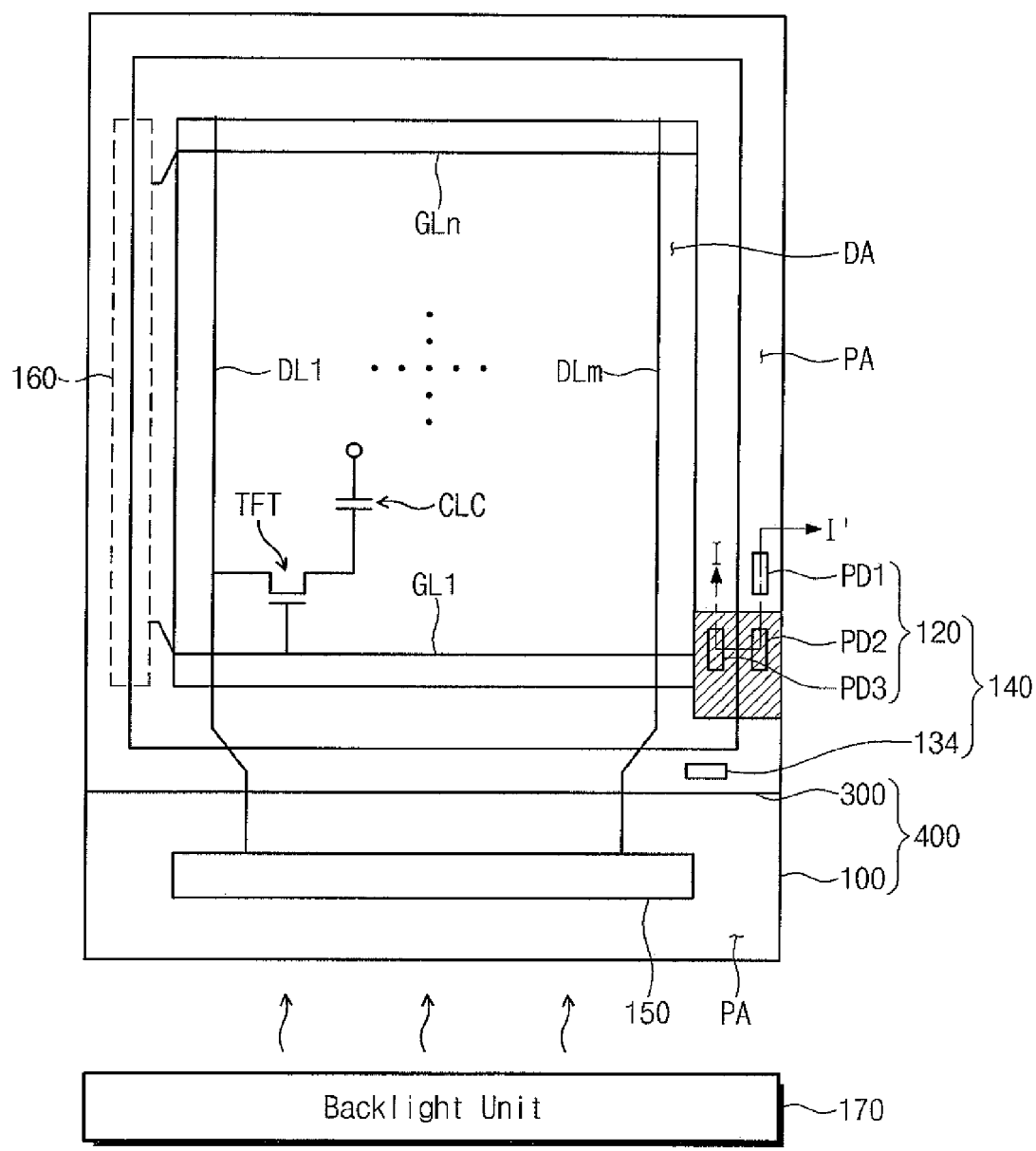
FIG. 1 is a block diagram illustrating an LCD according to an exemplary embodiment of the present invention.

Hereinafter, exemplary embodiments of the present invention will be explained in more detail with reference to the accompanying drawings. However, the scope of the present invention is not limited to such exemplary embodiments and other embodiments of the present invention may be realized in various forms. The same reference numerals are used to designate the same elements throughout the drawings.

Figure 2:
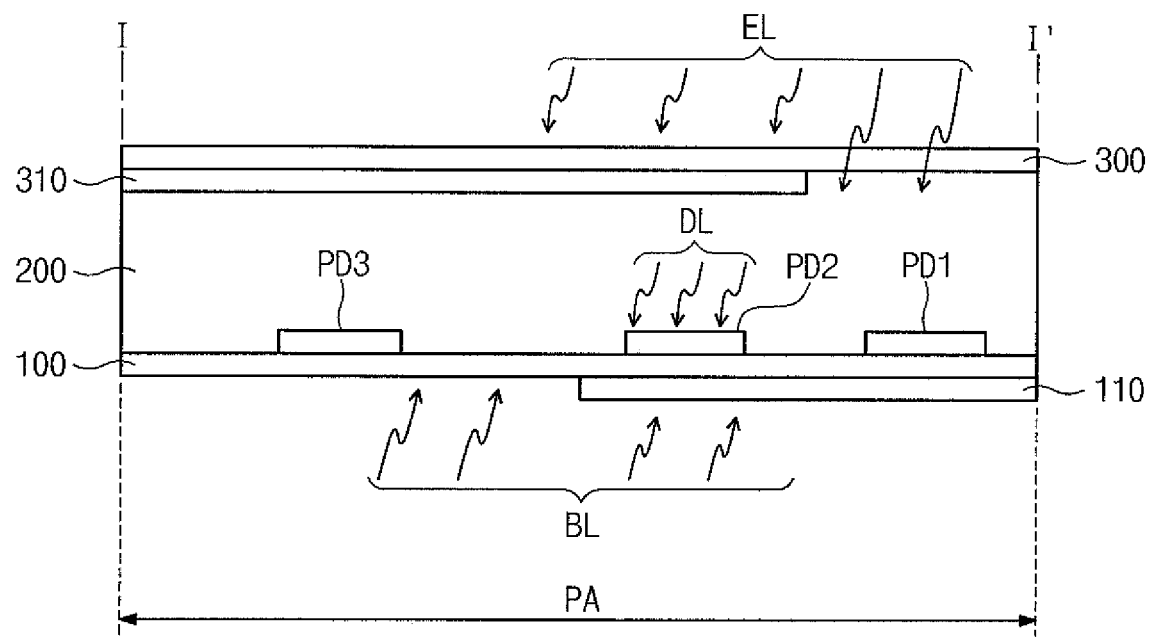
FIG. 2 is a sectional view taken along line I-I' shown in FIG. 1.

FIG. 1 is a block diagram illustrating an LCD according to an exemplary embodiment of the present invention, and FIG. 2 is a sectional view taken along line I-I' shown in FIG. 1.

Referring to FIGS. 1 and 2, an LCD 500 includes an LCD panel 400, drivers 150 and 160, and a light sensing circuit 140. In addition, the LCD 500 further includes a backlight unit 170.

The LCD panel 400 displays an image by using light. The LCD panel 400 includes a display area DA, which displays the image, and a peripheral area PA surrounding the display area DA. The peripheral area PA and the display area DA may be disposed on an upper surface of the LCD panel 400.

The LCD panel 400 includes an array substrate 100, an opposite substrate 300 facing the array substrate 100, and a liquid crystal layer 200 interposed between the array substrate 100 and the opposite substrate 300.

The LCD panel includes a plurality of gate lines GL1 to GLn and a plurality of data lines DL1 to DLm, which cross the gate lines GL1 to GLn while being insulated from the gate lines GL1 to GLn. The gate lines GL1 to GLn and the data lines DL1 to DLm may be disposed on a front surface of the array substrate 100 corresponding to the display area DA.

The display area DA may include a plurality of pixel areas in the form of a matrix of the gate lines GL1 to GLn and the data lines DL1 to DLm. Each pixel area may include a thin film transistor TFT and a liquid crystal capacitor CLC connected to the thin film transistor TFT. For example, a gate electrode of the thin film transistor TFT may be connected to a first gate line GL1, a source electrode of the thin film transistor TFT may be connected to a first data line DL1, and a drain electrode of the thin film transistor TFT may be connected to an upper electrode (not shown) of the liquid crystal capacitor CLC in a first pixel area.

The drivers 150 and 160 may be disposed on the array substrate 100 corresponding to the peripheral area PA. The drivers 150 and 160 may include a data driver 150 and a gate driver 160. The data driver 150 is electrically connected to the data lines DL1 to DLm to apply data signals to the data lines DL1 to DLm, and the gate driver 160 is electrically connected to the gate lines GL1 to GLn to apply gate signals to the gate lines GL1 to GLn. The gate signals are used to turn on the thin film transistor TFT connected to the gate lines GL1 to GLn. The data driver 150 may be mounted on the array substrate 100 corresponding to the peripheral area PA through a chip on glass (COG) scheme, and the gate driver 160 may be integrated on the peripheral area PA adjacent the data driver 150 through a thin film process. The gate driver 160 may include polysilicon type transistors integrated on the array substrate 100.

A first light blocking layer 110 may be disposed on a rear surface of the array substrate 100 corresponding to the peripheral area PA. The first light blocking layer 110 may surround the display area DA. The first light blocking layer 110 may prevent light generated from the backlight unit 170 from being introduced into first and second sensors PD1 and PD2 provided on the light sensing circuit 140.

A second light blocking layer 310 and a common electrode layer (not shown) may be disposed on the opposite substrate 300. The second light blocking layer 310 may prevent external light from being introduced into second and third sensors PD2 and PD3 provided on the light sensing circuit 140.

The light sensing circuit 140 may be provided on the peripheral area of the array substrate 100. The light sensing circuit 140 detects brightness information of the external light incident into the LCD panel 400. The light sensing circuit 140 includes a sensor unit 120 and readout circuit 134.

The sensor unit 120 includes first to third sensors PD1, PD2 and PD3. For example, the first to third sensors PD1, PD2 and PD3 may include photodiodes. Hereinafter, the first to third sensors will be referred to as first to third photodiodes PD1, PD2 and PD3, respectively.

As shown in FIG. 2, the first and second photodiodes PD1 and PD2 are blocked from internal light BL (hereinafter, referred to as backlight) by the first light blocking layer 110, and the second and third photodiodes PD2 and PD3 are blocked from external light EL by the second light blocking layer 310. Thus, the first photodiode PD1 only detects the external light EL, the third photodiode PD3 only detects the backlight BL, and the second diode PD2 only detects peripheral light DL (hereinafter, dark light) isolated from the external light and the backlight.

The light sensing circuit 140 may be integrated on a predetermined region of the array substrate 100, which corresponds to the peripheral area PA, together with the gate driver 160 through a thin film process. The light sensing circuit 140 may include polysilicon type transistors similar to the transistors of the gate driver 160. As a result, the process of forming the gate driver 160 and the light sensing circuit 140 on the array substrate 100 may be simplified.

Figure 3:
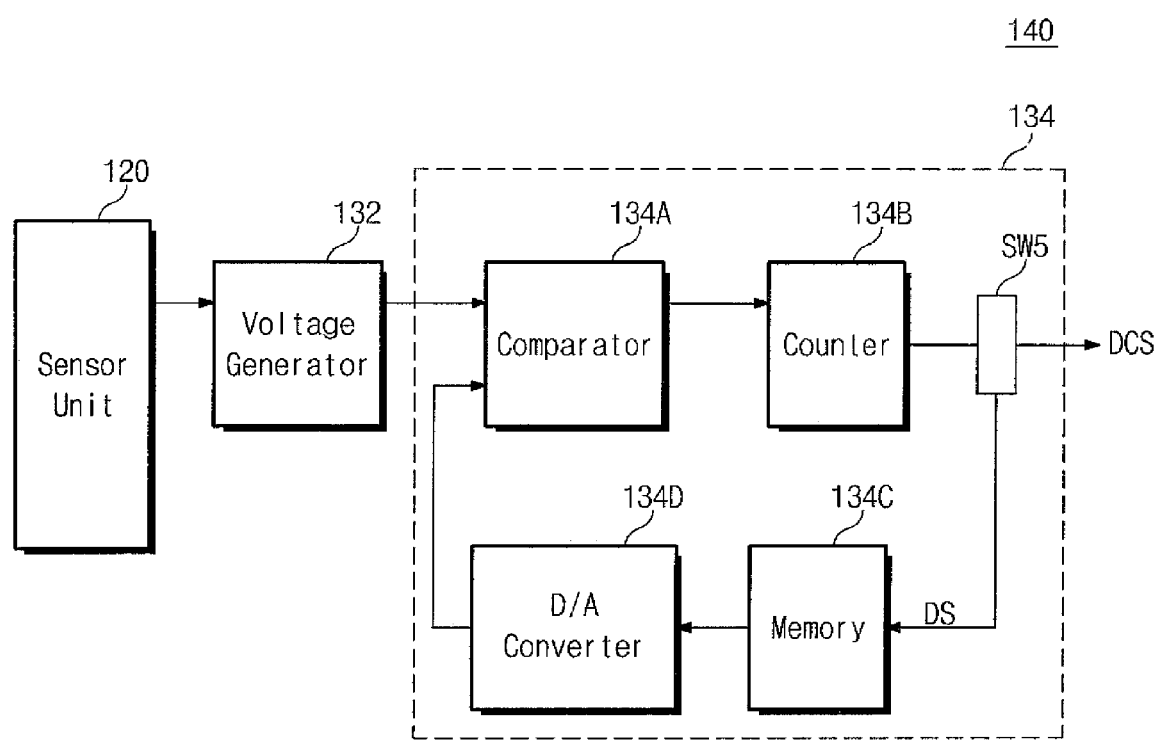
FIG. 3 is a block diagram illustrating a light sensing circuit shown in FIG. 1 according to an exemplary embodiment of the present invention.
Figure 4:
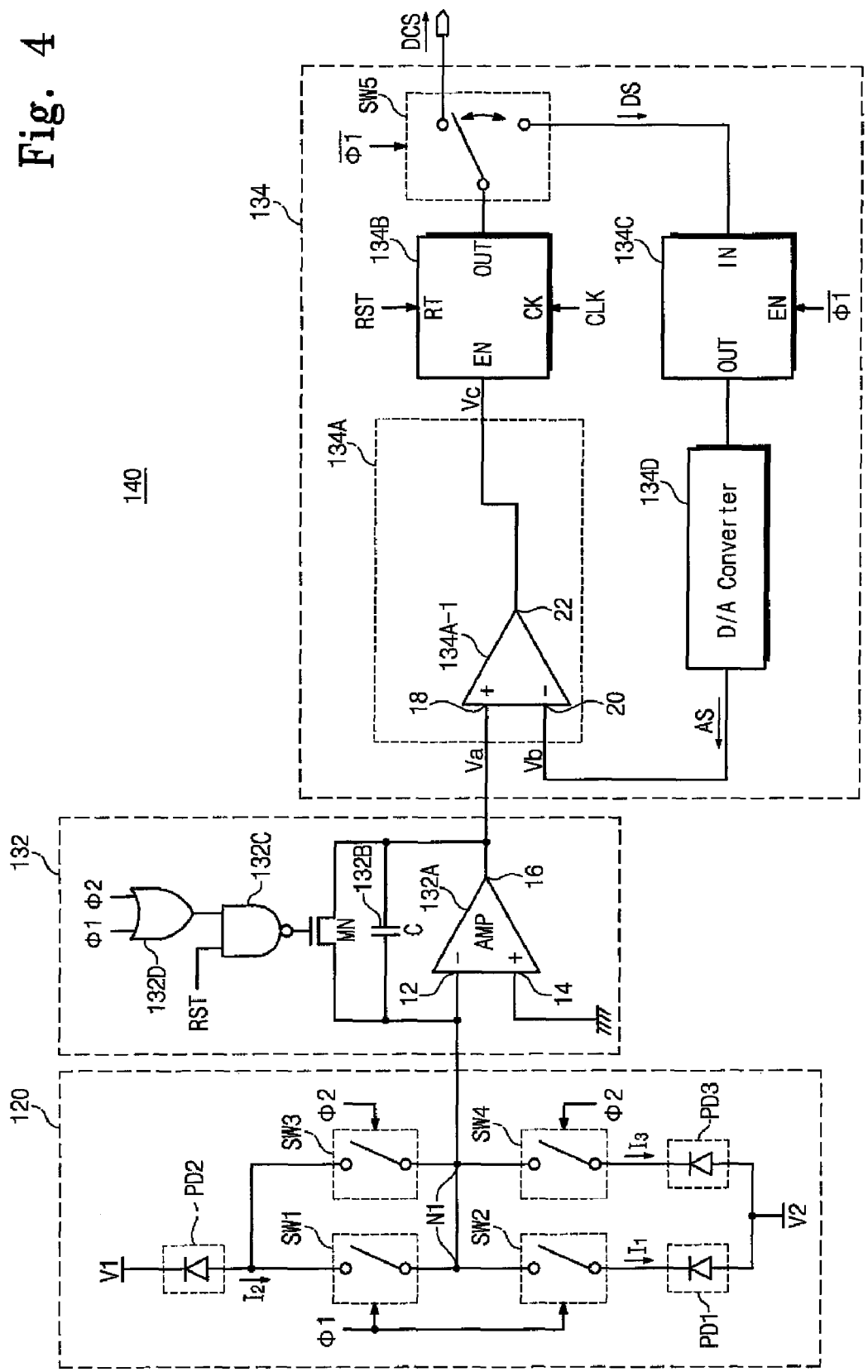
FIG. 4 is a circuit diagram illustrating a light sensing circuit shown in FIG. 3.

FIG. 3 is a block diagram illustrating the light sensing circuit shown in FIG. 1 according to an exemplary embodiment of the present invention, and FIG. 4 is a circuit diagram illustrating the light sensing circuit shown in FIG. 3. Referring to FIGS. 3 and 4, the light sensing circuit 140 includes a sensor unit 120, a voltage generator 132 and a readout circuit 134.

The sensor unit 120 includes the first photodiode PD1, which detects the external light EL to output a first current value I1, the third photodiode PD3, which detects the backlight BL generated from the backlight unit to output a third current value I3, and the second photodiode PD2, which detects the dark light DL isolated from the external light EL and the backlight BL to output a second current value I2. The sensor unit 120 includes first and second switching circuits SW1 and SW2 that control an electric connection between the first and second photodiodes PD1 and PD2, and third and fourth switching circuits SW3 and SW4 that control an electric connection between the second and third photodiodes PD2 and PD3.

The second photodiode PD2, the third switching circuit SW3, the fourth switching circuit SW4 and the third photodiode PD3 are serially connected between first voltage V1 and second voltage V2, which is lower than the first voltage V1. The second photodiode PD2 may be connected to the first voltage V1 in the inverse direction, and the third photodiode PD3 may be connected to the second voltage V2 in the inverse direction. When the third and fourth switching circuits SW3 and SW4 are turned on in response to a second switching signal φ2 having, e.g., a high state, the second and third photodiodes PD2 and PD3 are serially connected between the first voltage V1 and second voltage V2. Thus, the second and third photodiodes PD2 and PD3, which are connected to each other in series, comprise a first subtraction circuit. As a result, a first differential value (I3−I2) between the third current value I3 corresponding to the backlight BL and the second current value I2 corresponding to the dark light DL is output through a first node N1.

The first switching circuit SW1, the second switching circuit SW2, and the first photodiode PD1 are serially connected between second photodiode PD2 and the second voltage V2. The first photodiode PD1 is connected to the second voltage V2 in the inverse direction. When the first and second switching circuits SW1 and SW2 are turned on in response to a first switching signal φ1 having, e.g., a high state, the first and second photodiodes PD1 and PD2 are serially connected between the first voltage V1 and second voltage V2. Thus, the first and second photodiodes PD1 and PD2, which are serially connected between the first and second voltages V1 and V2, comprise a second subtraction circuit. As a result, a second differential value (I1−I2) between the first current value I1 corresponding to the external light EL and the second current value I2 corresponding to the dark light DL is output through the first node N1.

The voltage generator 132 is electrically connected to the first node N1 to receive the first and second differential values (I3−I2 and I1−I2) from the sensor unit 120. The voltage generator 132 generates a reference voltage in response to the first differential value (I3−I2) and generates a sensing voltage in response to the second differential value (I1−I2).

The voltage generator 132 may include a first operational amplifier (AMP) 132A, a capacitor (C) 132B and an NMOS transistor MN. The first operational amplifier 132A includes an inverting terminal 12 connected to the first node N1 of the sensor unit 120 to receive the first and second differential values (I3−I2 and I1−I2), a non-inverting terminal 14 connected to a ground voltage, and an output terminal 16, which outputs the reference voltage VBL by integrating the first differential value (I3−I2) and the sensing voltage by integrating the second differential value (I1−I2). The capacitor 132B and the NMOS transistor MN are connected between the inverting terminal 12 of the first operational amplifier 132A and an output terminal 16 of the first operational amplifier 132A in parallel through a feedback scheme. An output terminal of a NAND gate 132C is connected to a gate terminal of the NMOS transistor MN and an output terminal of an OR gate 132D is connected to one input terminal of the NAND gate 132C. A reset signal RST is applied to the other input terminal of the NAND gate 132C.

The voltage generator 132 having the above circuit configuration comprises an integration circuit. If the first differential value (I3−I2) is applied to the inverting terminal 12 of the first operational amplifier 132A from the sensor unit 120 when the NMOS transistor MN is turned off, the reference voltage, which rises to a target voltage VBLU, is generated at the output terminal 16 of the first operational amplifier 132A. A first rising time TBLU, which may be referred to as a time to reach the target voltage from the reference voltage, may be expressed by Equation 1 as follows:

$$TBLU = VBLU \times C \div (I3-I2),\qquad\text{Equation 1,}$$

where C represents a capacitance of the capacitor 132B. The VBLU and C may be determined empirically by, e.g., a system designer. Thus, VBLU and C are constants, and TBLU and (I3−I2) are variables.

Similarly, if the second differential value (I1−I2) is applied to the inverting terminal 12 of the first operational amplifier 132A from the sensor unit 120 when the NMOS transistor MN is turned off, the sensing voltage, which rises to a predetermined voltage, is generated at the output terminal 16 of the first operational amplifier 132A. A second rising time TPD, which may be referred to as a time to reach the predetermined voltage from the sensing voltage, may be expressed by Equation 2 as follows:

$$TPD = VBLU \times C \div (I1-I2).\qquad\text{Equation 2,}$$

Referring again to FIG. 3, the readout circuit 134 detects the first rising time TBLU and converts the detected first rising time TBLU into digital reference data. The digital reference data may be stored in a memory. Then, the readout circuit 134 detects the second rising time TPD and converts the detected second rising time TPD into digital data. The readout circuit 134 compares the digital data with the digital reference data stored in the memory and outputs the comparison result as brightness information of the external light.

The readout circuit 134 may include a comparator 134A, a counter 134B, a memory 134C and a D/A converter 134D. The comparator 134A includes a non-inverting terminal 18 connected to the output terminal 16 of the first operational amplifier 132A of the voltage generator 132, an inverting terminal 20 connected to an output terminal of the D/A converter 134D, and an output terminal 22.

When the reference voltage obtained by integrating the first differential value (I2−I3) is applied to the non-inverting terminal 18 of the comparator, the D/A converter 134D does not apply a voltage to an inverting terminal 20 of a second operational amplifier 134A-1. For example, the inverting terminal 20 of the second operational amplifier 134A-1 may be grounded. Thus, the comparator 134A outputs the reference voltage, which rises to the target voltage during the first rising time TBLU.

The counter 134B may include an enable terminal connected to the output terminal 22 of the comparator 134A, a reset terminal RT receiving a reset signal RST to initialize the counting operation, a clock terminal CK receiving a reference clock CLK, and an output terminal OUT outputting the count result as digital data. The counter 134B may start a counting operation when the reference voltage is output from the comparator 134A.

The memory 134C may receive the number of reference clocks CLK from the counter 134B through an input terminal thereof and may store the number of reference clocks CLK as digital reference data. The digital reference data may be applied to the D/A converter 134D through an output terminal of the memory 134C. The D/A converter 134D converts the digital reference data into an analog voltage AS and the analog voltage AS is fed back to the inverting terminal 20 of the comparator 134A. Upon receiving the analog voltage AS, the comparator 134A compares the analog voltage AS with the reference voltage. The counter 134B continuously counts the number of reference clocks CLK until the analog voltage AS becomes identical or substantially identical to the reference voltage. For example, the counter 134B sequentially increases a count of the number of reference clocks CLK stored in the memory 134C as digital reference data.

If the reference voltage reaches the target voltage VBLU, the counter 134B stops the counting operation and may be electrically disconnected from the memory 134C by the fifth switching circuit SW5. The number of reference clocks CLK, which is obtained when the reference voltage reaches the target voltage VBLU, may be stored in the memory 134C. For example, the number of reference clocks CLK stored in the memory 134C may be set as digital reference data corresponding to the first rising time TBLU. The digital reference data may be converted into the analog voltage corresponding to the first rising time TBLU through the D/A converter 134D, and the analog voltage may be applied to the inverting terminal 20 of the comparator 134A.

Then, the comparator 134A compares the sensing voltage corresponding to the external light with the analog voltage AS and outputs the comparison result as digital control data DCS. The digital control data DCS may serve as brightness information of the external light.

Figure 5:
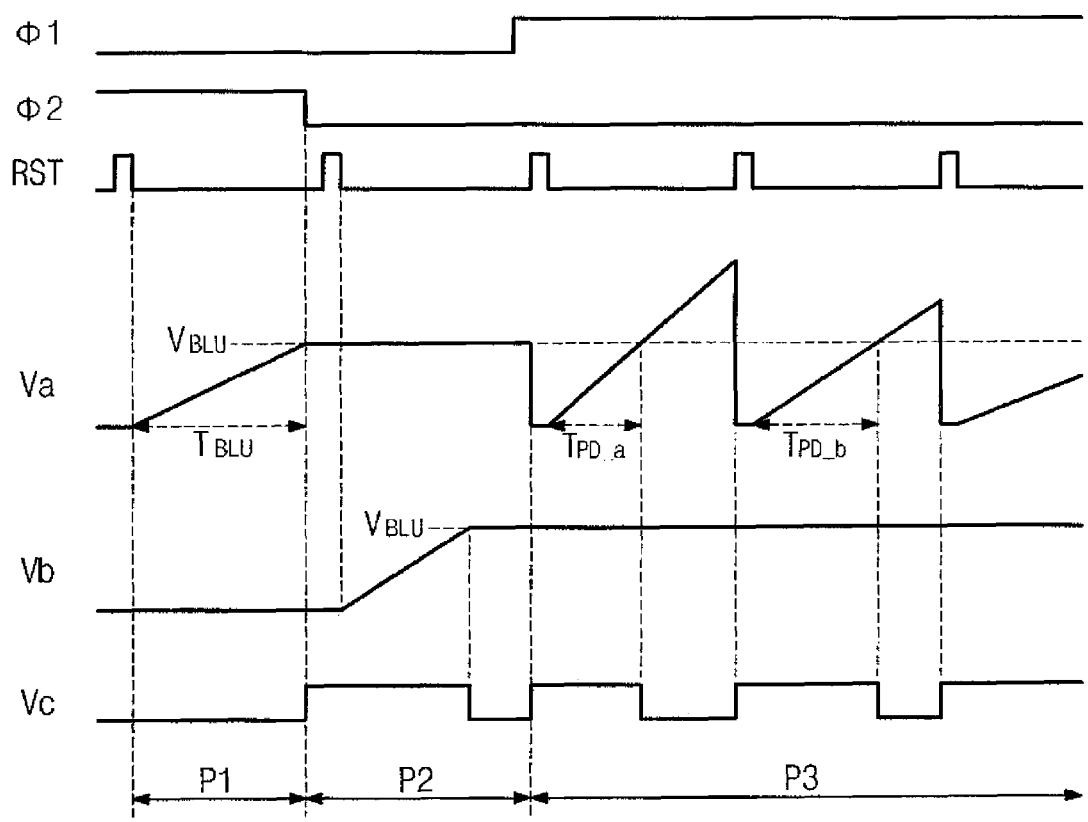
FIG. 5 is a timing diagram illustrating an operation of a light sensing circuit shown in FIG. 4.

FIG. 5 is a timing diagram illustrating an exemplary operation of the light sensing circuit 140 shown in FIG. 4. Referring to FIG. 5, an operational period of the light sensing circuit 140 is divided into a first period P1 to generate the reference voltage, a second period P2 to generate the digital reference voltage corresponding to the first rising time TBLU, and a third period P3 to generate digital data corresponding to the second rising time TPD_a and TPD_b.

If the first switching signal φ1 having the low state is applied the first and second switching circuits SW1 and SW2 and the second switching signal φ2 having the high state is applied to the third and fourth switching circuits SW3 and SW4 during the first period P1, the sensor unit 120 outputs the first differential value (I3−I2) between the third current value I3 and the second current value I2. At this time, the NMOS transistor MN provided in the voltage generator 132 shown in FIG. 4 is turned off. Thus, the reference voltage, which rises to the target voltage VBLU during the first rising time TBLU, is generated at the output terminal 16 of the first operational amplifier 132A by integrating the first differential value (I3−I2).

In the second period P2, the first switching signal φ1 is maintained in the low state and the second switching signal φ2 is transitioned from the high state to the low state. At this time, the NMOS transistor MN provided in the voltage generator 132 is turned on. Therefore, the electric potential is held as the target voltage of the reference voltage at the output terminal 16 of the first operational amplifier 132A of the voltage generator 132.

Next, the reference voltage, which rises to the target voltage VBLU during the first rising time TBLU, is applied to the enable terminal EN of the counter 134B shown in FIG. 4 through the comparator 134A as an enable signal Vc. The counter 134B starts the counting operation for the reference clocks CLK in response to the enable signal Vc having the high state. The number of reference clocks CLK counted by the counter 134B is converted into the analog voltage AS through the memory 134C and the D/A converter 134D, and the analog voltage AS is fed back to the inverting terminal 20 of the comparator 134A. The comparator 134A outputs the enable signal Vc having the high state until the analog voltage AS reaches the target voltage VBLU of the reference voltage. If the analog voltage AS reaches the target voltage VBLU of the reference voltage, the enable signal Vc is transitioned from the high state to the low state.

While the enable signal Vc is being maintained in the high state, the number of reference clocks CLK counted by the counter 134B is set as the digital reference data. As a result, the first rising time TBLU is stored in the memory 134C shown in FIG. 4 as digital data.

During the third period P3, the second rising time TPD_a of the sensing voltage corresponding to the external light is converted into digital data during a reset period of the reset signal RST. Consequently, the readout circuit 134 compares the digital data corresponding to the second rising time TPD_a, which is generated every reset period, with the digital reference data corresponding to the first rising time TBLU, and outputs the comparison result as digital control data DCS. The digital control data DCS may be supplied to the backlight unit as brightness information of the external light. Thus, the backlight unit can control the brightness of the backlight supplied to the LCD panel 400 shown in FIG. 1 based on the digital control data DCS.

According to at least one of the above described embodiment of the present invention, a second rising time of a sensing voltage generated from external light and dark light may be detected based on a first rising time of a reference voltage generated from light of a backlight unit and the dark light. The detected second rising time serves as brightness information of the external light. Therefore, the same digital output value can be obtained under the same peripheral luminance regardless of deviation between the sensors. A light sensing circuit according to at least one of the above described embodiments may be integrated on an LCD panel, so that the manufacturing time and the manufacturing cost for the LCD can be reduced.

Although exemplary embodiments of the present invention have been described, it is understood that the present invention should not be limited to these exemplary embodiments, and various changes and modifications can be made by one ordinary skilled in the art within the spirit and scope of the disclosure.

What is claimed is:

1. A light sensing circuit for a liquid crystal display having a backlight unit, the light sensing circuit comprising:
   sensor unit comprising:
      a first sensor that detects an external light to output a first current value;
      a third sensor that detects an internal light generated from the backlight unit to output a third current value; and
      a second sensor that detects a peripheral light isolated from the external light and the internal light to output a second current value, wherein the sensor unit outputs a first differential value between the third current value and the second current value and a second differential value between the first current value and the second current value;
   a voltage generator generating a reference voltage in response to the first differential value and generating a sensing voltage in response to the second differential value; and
   a readout circuit generating brightness information of the external light using the reference voltage and the sensing voltage,
   wherein the second and third sensors are serially connected between a first voltage and a second voltage lower than the first voltage to comprise a first subtraction circuit that outputs the first differential value, and the second and first sensors are serially connected between the first voltage and the second voltage to comprise a second subtraction circuit that outputs the second differential value.

2. The light sensing circuit of claim 1, wherein the first, second, and third sensors comprise photodiodes.

3. The light sensing circuit of claim 1, wherein the voltage generator comprises:
   an operational amplifier comprising an input terminal receiving the first and second differential values, and an output terminal outputting the reference voltage by integrating the first differential value and outputting the sensing voltage by integrating the second differential value; and
   a capacitor connected between the input terminal and the output terminal of the operational amplifier to feedback the reference voltage and the sensing voltage to the input terminal.

4. A light sensing circuit for a liquid crystal display having a backlight unit, the light sensing circuit comprising:

sensor unit comprising:
  a first sensor that detects an external light to output a first current value;
  a third sensor that detects an internal light generated from the backlight unit to output a third current value; and
  a second sensor that detects a peripheral light isolated from the external light and the internal light to output a second current value, wherein the sensor unit outputs a first differential value between the third current value and the second current value and a second differential value between the first current value and the second current value;
a voltage generator generating a reference voltage in response to the first differential value and generating a sensing voltage in response to the second differential value; and
a readout circuit generating brightness information of the external light using the reference voltage and the sensing voltage,
wherein the readout circuit generates the brightness information by detecting a first rising time, during which the reference voltage reaches a predetermined target voltage, and a second rising time, during which the sensing voltage reaches the predetermined target voltage, based on the first rising time, and outputting the second rising time as the brightness information of the external light.

5. The light sensing circuit of claim 4, wherein the readout circuit comprises:
  a comparator comparing the sensing voltage with the reference voltage to output an enable signal maintained in a high state when the second rising time of the sensing voltage is shorter than the first rising time of the reference voltage and maintained in a low state when the second rising time of the sensing voltage is longer than the first rising time of the reference voltage; and
  a counter receiving the enable signal and counting a number of reference clocks while the enable signal is being maintained in the high state to output the number of reference clocks as digital data.

6. The light sensing circuit of claim 5, wherein the counter stops the counting when the enable signal is maintained in the low state.

7. The light sensing circuit of claim 5, wherein the counter receives the reference voltage from the voltage generator, counts the first rising time of the reference voltage, and outputs a count result as digital control data.

8. The light sensing circuit of claim 7, wherein the readout circuit further comprises:
  a memory storing the digital reference data; and
  a digital/analog converter receiving the digital reference data from the memory to convert the digital reference data into the reference voltage.

9. The light sensing circuit of claim 7, wherein the digital/analog converter supplies the reference voltage to an input terminal of the comparator.

10. A liquid crystal display comprising:
  a liquid crystal display panel comprising a display area displaying an image using a backlight;
  a light sensing circuit detecting brightness information of an external light incident into the liquid crystal display panel; and
  a backlight unit supplying the backlight to the liquid crystal display panel and controlling a brightness of the backlight based on the brightness information,
  wherein the light sensing circuit comprises:
    a first sensor that detects the external light to output a first current value, a third sensor that detects the backlight to output a third current value, and a second sensor that detects a peripheral light isolated from the external light and the backlight to output a second current value, the sensor unit outputting a first differential value between the third current value and the second current value and a second differential value between the first current value and the second current value;
    a voltage generator generating a reference voltage in response to the first differential value and generating a sensing voltage in response to the second differential value; and
    a readout circuit detecting a first rising time, during which the reference voltage reaches a predetermined target voltage, and a second rising time, during which the sensing voltage reaches the predetermined target voltage, based on the first rising time, and outputting the second rising time as brightness information of the external light.

11. The liquid crystal display of claim 10, wherein the liquid crystal display panel further comprises a peripheral area surrounding the display area and the light sensing circuit is disposed on the peripheral area.

12. The liquid crystal display of claim 11, wherein the light sensing circuit is integrated on the peripheral area through a thin film process.

13. The liquid crystal display of claim 10, wherein the voltage generator comprises:
  an operational amplifier comprising an input terminal receiving the first and second differential values, and an output terminal outputting the reference voltage by integrating the first differential value and outputting the sensing voltage by integrating the second differential value; and
  a capacitor connected between the input terminal and the output terminal of the operational amplifier to feedback the reference voltage and the sensing voltage to the input terminal.

14. The liquid crystal display of claim 10, wherein the readout circuit comprises:
  a comparator comparing the sensing voltage with the reference voltage to output an enable signal maintained in a high state when the second rising time of the sensing voltage is shorter than the first rising time of the reference voltage and maintained in a low state when the second rising time of the sensing voltage is longer than the first rising time of the reference voltage; and
  a counter receiving the enable signal and counting a number of reference clocks while the enable signal is being maintained in the high state to output the number of reference clocks as digital data.

15. The liquid crystal display of claim 10, wherein the liquid crystal display panel comprises:
  an array substrate;
  an opposite substrate facing the array substrate;
  a liquid crystal layer interposed between the array substrate and the opposite substrate;
  a first light blocking layer disposed on the array substrate and configured to prevent backlight from being introduced into the first sensor and the second sensor; and
  a second light blocking disposed on the opposite substrate and configured to prevent the external light from being introduced into the second sensor and the third sensor.

16. The liquid crystal display of claim 15, wherein the first light blocking layer surrounds the display area.

17. The liquid crystal display of claim 15, wherein the first light blocking layer overlaps the first sensor and the second sensor, and the second light blocking layer overlaps the second sensor and the third sensor.

18. A method of driving a light sensing circuit that detects brightness information of an external light, the method comprising:
   detecting the external light and outputting a first current value that is representative of the external light, detecting an internal light generated by a backlight and outputting a third current value that is representative of the internal light, and detecting a peripheral light isolated from the external light and the internal light and outputting a second current value that is representative of the peripheral light;
   detecting a first differential value between the third current value and the second current value and a second differential value between the first current value and the second current value;
   generating a reference voltage by integrating the first differential value;
   generating a sensing voltage by integrating the second differential value;
   converting the sensing voltage into digital data based on a first time during which the reference voltage reaches a predetermined target voltage; and
   detecting the brightness information of the external light based on the digital data.

19. The method of claim 18, wherein the converting of the sensing voltage into the digital data comprises:
   counting the first time and converting a count result thereof into first data;
   counting a second time during which the sensing voltage reaches the predetermined target voltage and converting a count result thereof into second data; and
   converting the second data into the digital data based on the first time included in the first data.

20. The method of claim 18, wherein the first time is a first rising time, during which the reference voltage reaches the predetermined target voltage and the brightness information is a second rising time, during which the sensing voltage reaches the predetermined target voltage, based on the first rising time.

* * * * *